US012581158B2

(12) United States Patent
Barnes

(10) Patent No.: US 12,581,158 B2
(45) Date of Patent: Mar. 17, 2026

(54) SYSTEM FOR CENSORING DIGITAL MEDIA

(71) Applicant: Benjamin Barnes, Logan, UT (US)

(72) Inventor: Benjamin Barnes, Logan, UT (US)

(73) Assignee: Benjamin Barnes, Logan, UT (US)

( * ) Notice: Subject to any disclaimer, the term of this patent is extended or adjusted under 35 U.S.C. 154(b) by 0 days.

(21) Appl. No.: 18/648,803

(22) Filed: Apr. 29, 2024

(65) Prior Publication Data

US 2025/0337980 A1      Oct. 30, 2025

(51) Int. Cl.
| | |
|---|---|
| *H04N 21/439* | (2011.01) |
| *H04N 21/2187* | (2011.01) |
| *H04N 21/44* | (2011.01) |
| *H04N 21/485* | (2011.01) |

(52) U.S. Cl.
CPC ..... *H04N 21/4392* (2013.01); *H04N 21/2187* (2013.01); *H04N 21/44* (2013.01); *H04N 21/4852* (2013.01)

(58) Field of Classification Search
CPC ........... H04N 21/2187; H04N 21/4392; H04N 21/44; H04N 21/4852
See application file for complete search history.

(56) References Cited

U.S. PATENT DOCUMENTS

| | | | | | |
|---|---|---|---|---|---|
| 4,570,232 A | * | 2/1986 | Shikano | ................... | G10L 15/12 |
| | | | | | 704/241 |
| 5,598,557 A | * | 1/1997 | Doner | ................. | G06F 16/3346 |
| | | | | | 707/999.005 |

| | | | | | |
|---|---|---|---|---|---|
| 5,610,653 A | * | 3/1997 | Abecassis | .......... | H04N 21/4728 |
| | | | | | 386/E9.04 |
| 6,085,160 A | * | 7/2000 | D'hoore | ................. | G10L 15/005 |
| | | | | | 704/277 |
| 6,098,082 A | * | 8/2000 | Gibbon | ................. | G06F 16/739 |
| | | | | | 715/255 |
| 6,442,518 B1 | * | 8/2002 | Van Thong | ............. | G10L 15/26 |
| | | | | | 704/235 |
| 6,473,778 B1 | * | 10/2002 | Gibbon | ................. | G06F 40/103 |
| | | | | | 715/201 |
| 7,035,468 B2 | * | 4/2006 | Yogeshwar | ............. | G06F 16/71 |
| | | | | | 707/E17.031 |
| 7,047,191 B2 | * | 5/2006 | Lange | .................... | G10L 15/26 |
| | | | | | 704/235 |
| 7,065,524 B1 | * | 6/2006 | Lee | ........................ | G16H 50/50 |
| | | | | | 706/45 |
| 7,092,888 B1 | * | 8/2006 | McCarthy | .......... | G10L 15/1822 |
| | | | | | 704/277 |

(Continued)

*Primary Examiner* — Michael B. Pierorazio
(74) *Attorney, Agent, or Firm* — Dorsey & Whitney LLP

(57) ABSTRACT

A method for censoring digital media can include obtaining a user input via a user interface in regard to a digital video, obtaining an audio file for the digital video, and sending the audio file and a word back to an artificial intelligence (AI) engine. In some embodiments, the method can further include converting the audio file to text and identifying occurrences of words from the word bank and timestamps corresponding to the occurrences via the AI engine. In at least one embodiment, the timestamps received from the AI engine can correspond to moments in the digital video where the words in the word bank are used. Additionally, the method can include manipulating a mute function of a player of the digital video based on the timestamps received from the AI engine.

20 Claims, 10 Drawing Sheets

(56)　　　　　References Cited

U.S. PATENT DOCUMENTS

| | | | | |
|---|---|---|---|---|
| 7,110,664 B2* | 9/2006 | Yogeshwar | H04N 5/76 | 386/328 |
| 7,117,518 B1* | 10/2006 | Takahashi | H04N 21/44222 | 725/86 |
| 7,430,360 B2* | 9/2008 | Abecassis | H04N 7/17318 | 348/E7.071 |
| 7,509,385 B1* | 3/2009 | Rittmeyer | G06Q 10/107 | 715/224 |
| 7,729,917 B2* | 6/2010 | Miyamoto | G10L 15/22 | 704/275 |
| 7,739,253 B1* | 6/2010 | Yanovsky | G06F 16/9535 | 707/706 |
| 7,801,910 B2* | 9/2010 | Houh | G06F 16/583 | 707/765 |
| 7,908,628 B2* | 3/2011 | Swart | H04N 21/6377 | 725/135 |
| 7,962,331 B2* | 6/2011 | Miller | G10L 15/193 | 704/235 |
| 8,121,432 B2* | 2/2012 | Dorai | G06F 16/7844 | 382/276 |
| 8,131,545 B1* | 3/2012 | Moreno | G10L 15/04 | 704/235 |
| 8,209,724 B2* | 6/2012 | Rathod | H04N 21/435 | 348/715 |
| 8,248,528 B2* | 8/2012 | Hosking | H04N 7/165 | 725/62 |
| 8,423,363 B2* | 4/2013 | Gupta | G10L 15/22 | 704/251 |
| 8,572,488 B2* | 10/2013 | Phillips | G06F 3/0482 | 715/716 |
| 9,712,868 B2* | 7/2017 | Noland | H04N 21/441 | |
| 10,171,879 B2* | 1/2019 | Boudreau | H04N 21/47214 | |
| 2002/0055950 A1* | 5/2002 | Witteman | G06F 16/40 | 707/E17.009 |
| 2002/0093591 A1* | 7/2002 | Gong | H04N 21/2368 | 348/E7.063 |
| 2003/0025832 A1* | 2/2003 | Swart | H04N 21/4828 | 348/E7.071 |
| 2003/0061028 A1* | 3/2003 | Dey | G06F 16/40 | 704/9 |
| 2003/0169366 A1* | 9/2003 | Lenzi | H04N 7/10 | 348/461 |
| 2003/0206717 A1* | 11/2003 | Yogeshwar | G11B 27/10 | 386/328 |
| 2004/0096110 A1* | 5/2004 | Yogeshwar | G06F 16/51 | 707/E17.031 |
| 2004/0123135 A1* | 6/2004 | Goddard | H04N 21/4532 | 713/193 |
| 2005/0086069 A1* | 4/2005 | Watson | H04N 21/4755 | 726/3 |
| 2005/0227614 A1* | 10/2005 | Hosking | H04N 7/165 | 455/3.06 |
| 2006/0015339 A1* | 1/2006 | Charlesworth | G10L 15/187 | 704/E15.02 |
| 2006/0110136 A1* | 5/2006 | Abecassis | H04N 21/47 | 348/E7.071 |
| 2007/0124147 A1* | 5/2007 | Gopinath | G10L 15/19 | 704/E15.021 |
| 2007/0124756 A1* | 5/2007 | Covell | G06F 16/635 | 348/E7.071 |
| 2007/0124788 A1* | 5/2007 | Wittkoter | H04N 7/165 | 348/E7.071 |
| 2007/0157247 A1* | 7/2007 | Cordray | G06Q 30/02 | 348/E5.006 |
| 2007/0271580 A1* | 11/2007 | Tischer | H04H 60/07 | 725/35 |
| 2008/0066138 A1* | 3/2008 | Bishop | G06F 40/58 | 725/137 |
| 2008/0155614 A1* | 6/2008 | Cooper | H04N 21/23106 | 705/26.1 |
| 2008/0262996 A1* | 10/2008 | Yogeshwar | G06F 16/71 | 707/E17.031 |
| 2008/0266449 A1* | 10/2008 | Rathod | H04N 21/8133 | 348/E7.001 |
| 2009/0034426 A1* | 2/2009 | Luft | H04N 21/2407 | 370/252 |
| 2009/0133051 A1* | 5/2009 | Hildreth | H04N 21/42204 | 725/28 |
| 2009/0138805 A1* | 5/2009 | Hildreth | H04N 21/4755 | 715/745 |
| 2009/0164655 A1* | 6/2009 | Pettersson | H04L 65/65 | 709/231 |
| 2009/0171662 A1* | 7/2009 | Huang | G10L 15/1822 | 704/E15.041 |
| 2009/0172757 A1* | 7/2009 | Aldrey | H04N 7/173 | 725/110 |
| 2009/0181354 A1* | 7/2009 | Dasgupta | G09B 7/07 | 434/350 |
| 2010/0058400 A1* | 3/2010 | Nicas | H04N 7/17318 | 725/74 |
| 2010/0120008 A1* | 5/2010 | McDonagh | G09B 7/00 | 434/323 |
| 2010/0122293 A1* | 5/2010 | Craner | H04N 21/812 | 725/40 |
| 2010/0131385 A1* | 5/2010 | Harrang | G06Q 30/0631 | 705/26.1 |
| 2010/0250672 A1* | 9/2010 | Vance | G06Q 10/109 | 709/204 |
| 2011/0034242 A1* | 2/2011 | Aronzon | A63F 13/77 | 463/44 |
| 2011/0040559 A1* | 2/2011 | Kim | G10L 21/055 | 704/271 |
| 2011/0099572 A1* | 4/2011 | Craner | H04N 21/482 | 725/25 |
| 2011/0154385 A1* | 6/2011 | Price | G10L 17/00 | 725/12 |
| 2011/0193971 A1* | 8/2011 | Lin | H04N 7/18 | 348/207.1 |
| 2011/0283189 A1* | 11/2011 | McCarty | H04N 21/4532 | 715/810 |
| 2012/0075168 A1* | 3/2012 | Osterhout | G06F 3/017 | 345/8 |
| 2012/0117103 A1* | 5/2012 | Farrelly | H04L 67/10 | 707/769 |
| 2012/0192234 A1* | 7/2012 | Britt | H04N 21/4882 | 725/98 |
| 2012/0324550 A1* | 12/2012 | Wasilewski | H04N 21/4661 | 726/5 |
| 2013/0014136 A1* | 1/2013 | Bhatia | H04N 21/44218 | 725/9 |
| 2013/0254795 A1* | 9/2013 | Botta | H04N 21/4542 | 725/28 |
| 2014/0007150 A1* | 1/2014 | Bhide | H04N 21/266 | 725/14 |
| 2014/0208340 A1* | 7/2014 | Poornachandran | H04N 21/4751 | 725/10 |
| 2014/0229971 A1* | 8/2014 | Noland | H04N 21/2668 | 725/30 |
| 2014/0359647 A1* | 12/2014 | Shoemake | H04N 21/6582 | 725/10 |
| 2015/0026708 A1* | 1/2015 | Ahmed | H04N 21/812 | 725/12 |
| 2015/0070516 A1* | 3/2015 | Shoemake | H04N 21/4542 | 348/207.11 |
| 2015/0309687 A1* | 10/2015 | Herigstad | H04N 21/478 | 715/784 |
| 2016/0323643 A1* | 11/2016 | Panchaksharaiah | H04N 21/4753 | |
| 2018/0098127 A1* | 4/2018 | Boudreau | H04N 21/84 | |
| 2024/0379107 A1* | 11/2024 | Benedetto | G06F 40/30 | |

* cited by examiner

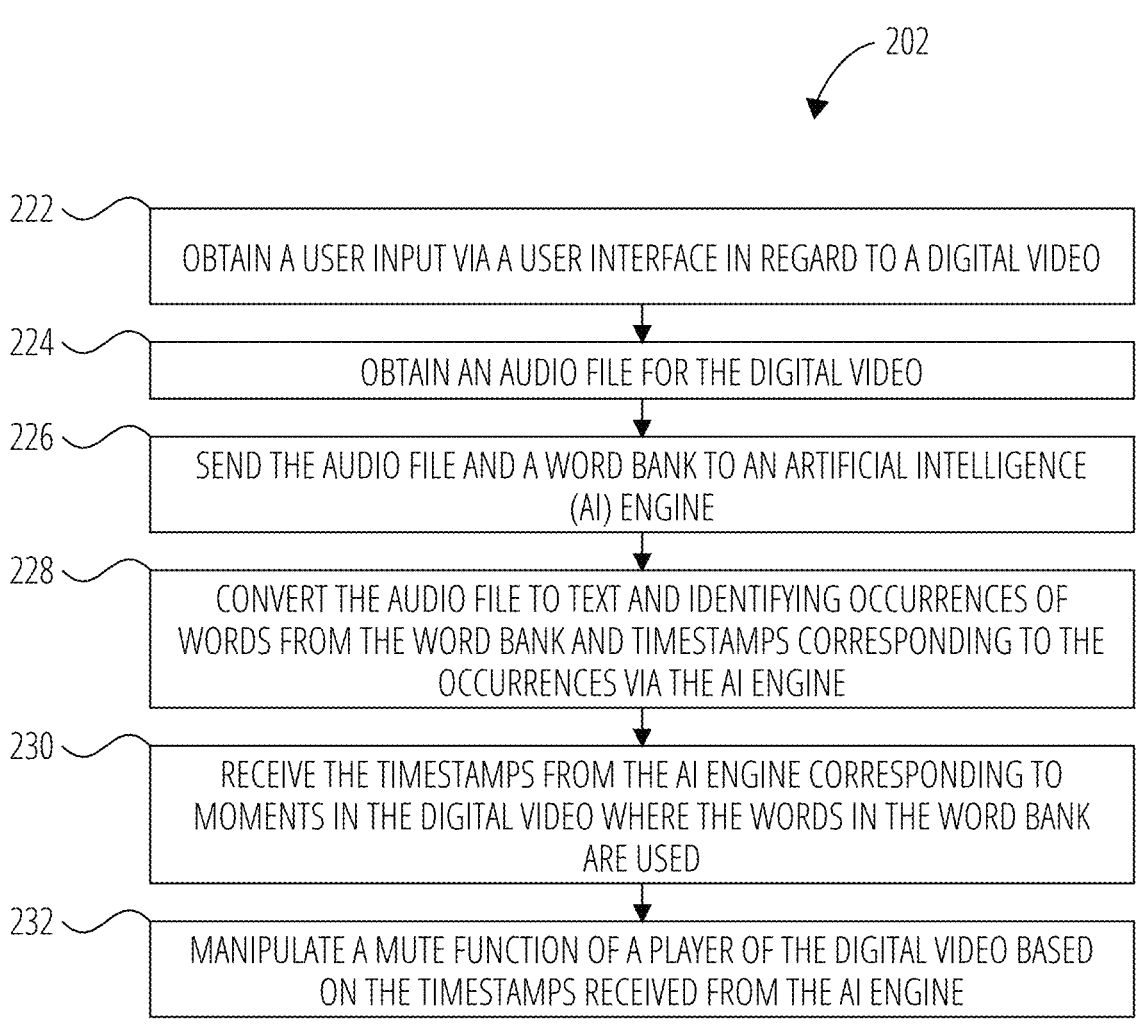

222 — OBTAIN A USER INPUT VIA A USER INTERFACE IN REGARD TO A DIGITAL VIDEO

224 — OBTAIN AN AUDIO FILE FOR THE DIGITAL VIDEO

226 — SEND THE AUDIO FILE AND A WORD BANK TO AN ARTIFICIAL INTELLIGENCE (AI) ENGINE

228 — CONVERT THE AUDIO FILE TO TEXT AND IDENTIFYING OCCURRENCES OF WORDS FROM THE WORD BANK AND TIMESTAMPS CORRESPONDING TO THE OCCURRENCES VIA THE AI ENGINE

230 — RECEIVE THE TIMESTAMPS FROM THE AI ENGINE CORRESPONDING TO MOMENTS IN THE DIGITAL VIDEO WHERE THE WORDS IN THE WORD BANK ARE USED

232 — MANIPULATE A MUTE FUNCTION OF A PLAYER OF THE DIGITAL VIDEO BASED ON THE TIMESTAMPS RECEIVED FROM THE AI ENGINE

FIG. 2

334 — Initial Display

336 — Prompt User

304 — User Input

338 — Buffer Time

316 — Word Bank

340 — User Confirmation

342 — Upload Input to Server

344 — Buffer Screen

346 — Completion Display

348 — Play Video

350 — Display "Mute" Icon

452

454 — Receive Timestamps From AI Engine

456 — Receive Buffer Time

458 — Calculate Buffer Interval

460

462 — Mute Audio Output

464 — Display "Mute" Icon

466 — Resume Audio Playback

406 — Playback Check

End Manipulation

414

674

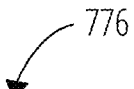
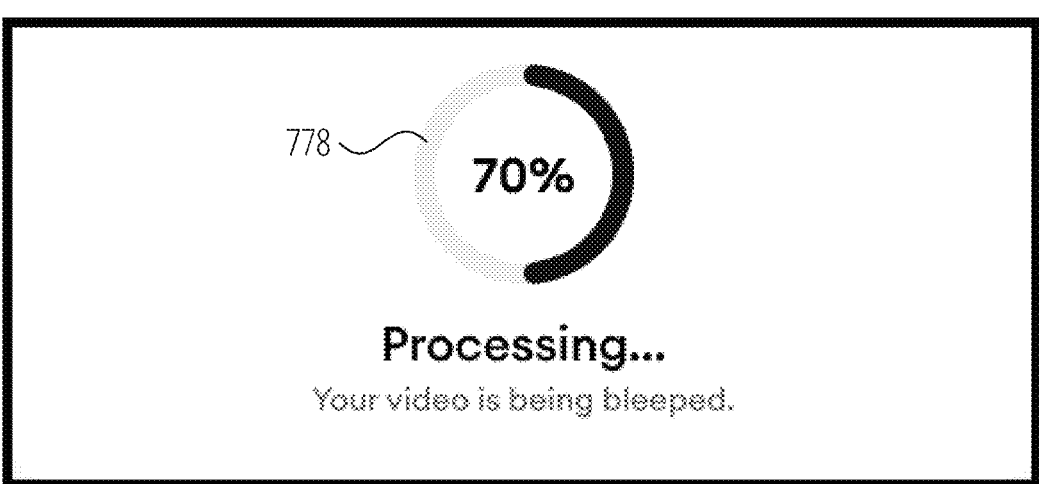
FIG. 7

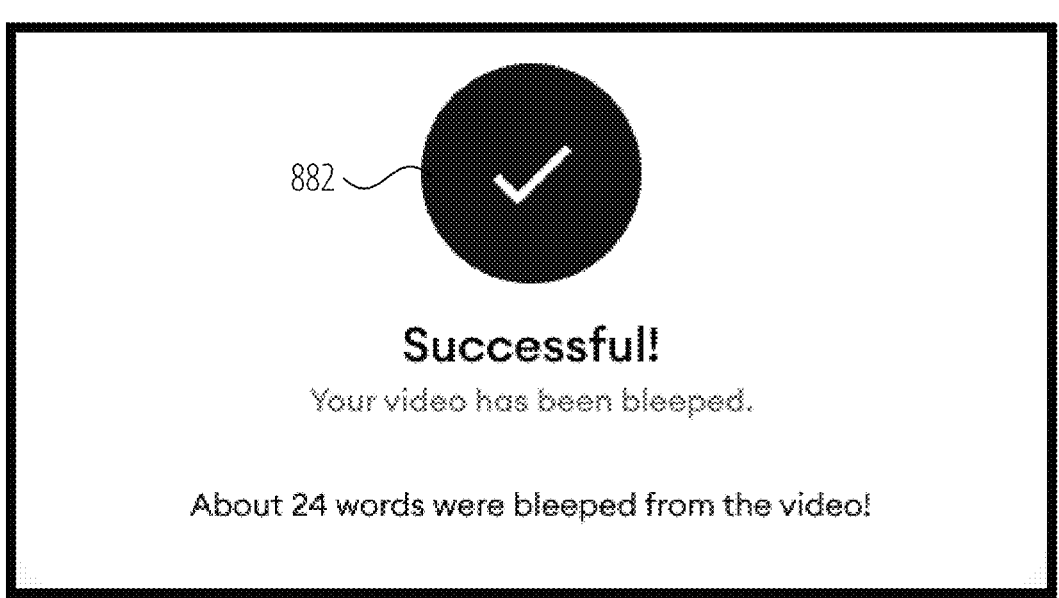
FIG. 8

SYSTEM FOR CENSORING DIGITAL MEDIA

TECHNICAL FIELD

This application relates generally to user interfaces and systems for censoring digital media, including muting the audio output of digital media sources using audio files, URLs, artificial intelligence engines, user input, connections, and APIs to censor a variety of content for a user.

BACKGROUND

Modern digital media outlets contain a wide variety of material, not all of which is suited for a variety of demographic groups. More specifically, vulgar language can be present in popular media such as movies, tv shows, online videos, and more. Many individuals may desire to avoid hearing explicit and/or crude language when engaging in media from different digital platforms. Adapting content for audiences in different cultural contexts might require censorship due to varying definitions of what is considered acceptable.

Video censoring may include detecting, analyzing, and managing video content in real-time or in post-processing. This may involve the application of various technologies and algorithms to filter, modify, or enhance video streams or files based on specific criteria, such as obscuring sensitive information, identifying specific objects or activities, or automating content moderation. Video censoring systems can be implemented in a wide range of applications, from security and surveillance to media content management, ensuring that the video content adheres to privacy laws, content policies, or user-defined preferences.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates a flowchart of the digital video censoring method according to one or more embodiments of the present disclosure;

FIG. 7 illustrates an example of a buffering screen displayed to a user via the UI according to one or more embodiments of the present disclosure;

FIG. 8 illustrates an example of a censored confirmation screen displayed to a user via the UI according to one or more embodiments of the present disclosure;

DETAILED DESCRIPTION

Figure 1:
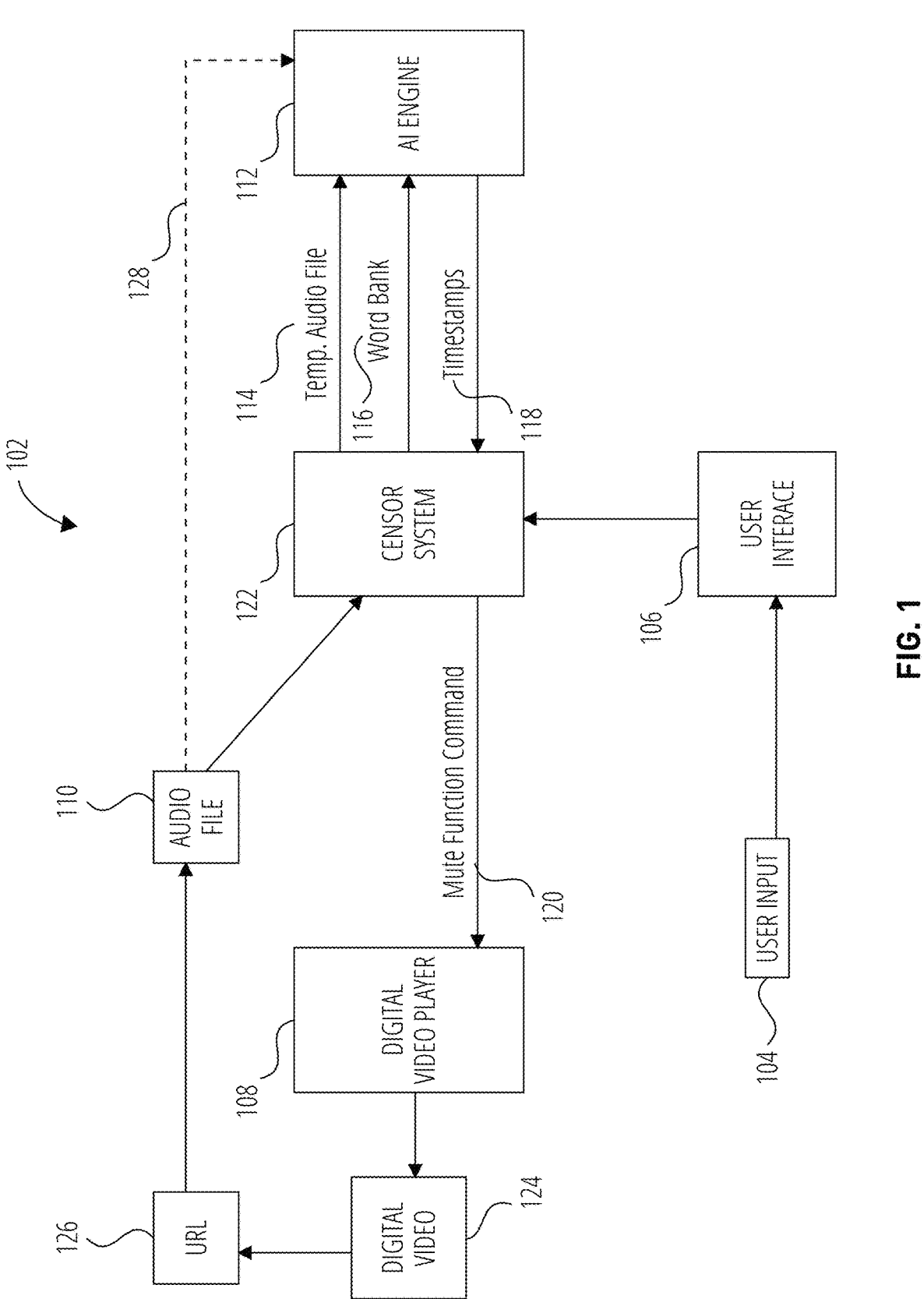
FIG. 1 illustrates a block diagram of a censor system according to one or more embodiments of the present disclosure.

The present disclosure describes a method for censoring digital media. Modern digital media outlets contain a wide variety of material which may not be suited for a variety of demographic groups. Vulgar language can be present in various popular media mediums such as movies, tv shows, online videos, and more. Viewers may desire to avoid hearing explicit and/or crude language when engaging in media from different digital platforms.

Current censoring applications may be able to censor instances of vulgar language present in modern media, but lack the ability to tailor a viewing experience to a user. For example, a viewer may desire to customize what language is censored in a digital medium. Additionally, current censoring applications may not be able to effectively censor online/social media platform videos or live videos common on many digital platforms and/or streaming services. The present disclosure proposes the development of a censoring application with the ability to tailor censoring to a viewer's specific needs that can effectively censor online/social media platform videos or live videos.

Some embodiments herein may include obtaining user inputs via a user interface in regard to a digital video, obtaining an audio file for the digital video, and sending the audio file and a word bank to an artificial intelligence (AI) engine. In some embodiments, the method can further include converting the audio file to text and identifying occurrences of words from the word bank and timestamps corresponding to the occurrences via the AI engine. Additionally, some embodiments herein can include receiving the timestamps from the AI engine corresponding to moments in the digital video where the words in the word bank are found, and manipulating a mute function of a player of the digital video based on the timestamps received from the AI engine.

In some embodiments, a user can enter custom words via the user interface (UI). These words can be added to the word bank and sent to the AI engine, where the AI engine can return timestamps for the custom words. This can enable the mute function to be activated for the custom words entered by the user, thus further tailoring the video censoring for the user. Additionally, manipulating the mute function can include using a series of Application Programming Interface (API) commands, such that the commands can manipulate the mute function in a player of a digital video to censor vulgar language. The user may also enter a buffer time via the UI. The buffer time may refer to the amount of time the video is muted for after a timestamp corresponding to a censored word is reached. For example, the user can choose the mute duration when a timestamp is reached, which can further tailor the censoring experience to the user.

In some embodiments where the user desires to censor a live feed, the method can include steps to censor the live video. In one or more embodiments, the method can include delaying the live feed, buffering audio file segments that occur during the delay, and repeatedly sending the audio file segments to the AI engine during the live feed. This can enable the live video to be censored after an initial set of timestamps is received from the AI engine.

FIG. 1 illustrates a signal flow block diagram 102 for censoring digital media, in accordance with one or more embodiments of the present disclosure. In some embodiments, the signal flow block diagram 102 can include a variety of steps associated with censoring language or other audial output for a variety of digital media sources.

In some embodiments, the steps shown in the signal flow block diagram 102 may be executed by one or more computers. For example, in at least one embodiment of the present disclosure, a non-transitory computer-readable can include instructions. When the instructions are executed by a computer, the instructions can cause the computer to execute one or more of the steps of the signal flow block diagram 102. Similarly, and in one or more examples, a computer apparatus can include a processor and a memory for storing instructions, that, when executed by the processor, configure the apparatus to execute one or more of the steps of the signal flow block diagram 102.

The illustrated signal flow block diagram 102 includes signaling between a digital video player 108, a censor system 122, an AI engine 112, and a user interface (UI) 106. In some embodiments, the digital video player 108, the censor system 122, and the AI engine 112 may all be located on a same system. In other embodiments, the digital video player 108, the censor system 122, and the AI engine 112 may be disparate systems.

In at least one embodiment, the UI 106 can be configured to prompt a user for the user input 104. In some embodiments, the UI 106 can prompt a user to enter a variety of information. In one or more embodiments, the user input 104 can include data such as custom words the user would like to censor, mute duration times, and other data pertaining to different sources of digital media.

In at least one embodiment, the UI 106 can be displayed via a computer apparatus. In one or more embodiments, the UI 106 can be displayed to the user via a display screen, phone screen, or through another kind of electronic device. In some embodiments, a user can enter the user input 104 into the UI 106 via the electronic device. For example, the user may type custom words desired to be censored onto a keyboard, or can otherwise articulate the user input 104 through a touch-sensitive display. This can enable the user to more easily determine the censored digital media content.

The UI 106 can provide controls and visual elements that can be used to interact with the censor system 122. In at least one embodiment, the censor system 122 can be a software application that can execute instructions pertaining to the signal flow block diagram 102. In some embodiments, the censor system 122 can be a search engine extension, application, or other software executable by an electronic device. As shown in FIG. 1, a user of the censor system 122 can enter the user input 104 into the UI 106, and the UI 106 can provide the input to the censor system 122. In one or more embodiments, the user input 104 can be entered into the censor system 122 via the UI 106. In some embodiments, the censor system 122 can apply the user input 104 to perform additional actions included in the signal flow block diagram 102. For example, if the user enters a custom word, the censor system 122 may add the word to a word bank 116 of censored words.

The digital media a user desires to censor via the censor system 122 can come from a variety of sources. In some embodiments, the digital media can be sourced from a digital video player 108. In at least one embodiment, the digital video player 108 can be a streaming service, mobile application, in-browser window, or other software capable of streaming a digital video 124. For example, the digital video player 108 can be a YouTube window, where YouTube can be configured to stream the digital video 124 to the user.

In some embodiments of the present disclosure, the censor system 122 can be an application separate from the digital video player 108.

In at least one embodiment, the signal flow block diagram 102 can further include the censor system 122 obtaining an audio file 110 for a digital video streamed from the digital video player 108. In some embodiments, the audio file 110 can be obtained by identifying, via the censor system 122, a Uniform Resource Locator (URL) 126 of the digital video 124. In at least one embodiment, the URL 126 can be a URL that is in focus when the user input 104 is received. For example, the URL 126 of the digital video 124 streamed by the digital video player 108 at the moment the user input 104 is received can be the URL that is identified. Based on the URL 126 the censor system 122 may obtain the audio file 110 linked with the digital video 124. Furthermore, the censor system 122 can be configured to store the audio file 110. This can enable the censor system 122 to correctly identify the digital video 124 the user desires to censor and request the audio file 110 in preparation for other actions included in the signal flow block diagram 102.

After receiving the audio file audio file 110 via the URL 126 of the digital video 124, the censor system 122 can be configured to communicate with an artificial intelligence (AI) engine 112. In some embodiments, the censor system 122 can send the audio file 110 to the AI engine 112. In at least one embodiment, a temporary audio file 114 can be created by the censor system 122, where the temporary audio file 114 can be a copy of the audio file 110. In this example, the censor system 122 can send the temporary audio file 114 to the AI engine 112. In some embodiments, the URL 126 of the digital video 124 can be sent directly to the AI engine 112. In this example, the AI engine 112 can be configured to receive the audio file 110 of the digital video 124 directly, as shown by the dotted line 128 in FIG. 1. The AI engine 112 can be configured to receive the audio file 110 of the digital video 124 either from the censor system 122 or directly as shown.

Additionally, the censor system 122 can send a word bank 116 to the AI engine 112. The censor system 122 may store and maintain the word bank 116. In some embodiments, the word bank 116 can include a default word list, user entered words through the user input 104, or a combination of a default word list and words entered by the user through the user input 104. For example, the user can enter custom words via the UI 106 that the user desires to censor in the digital video 124. These custom words can be stored in the word bank 116. The word bank 116 can be received by the AI engine 112. In at least one embodiment, the AI engine 112 can receive at least the audio file 110 and the word bank 116.

The censor system 122 may also provide a prompt to the AI engine 112 to convert the temporary audio file 114 to text and find the words in the word bank 116 in the text and corresponding timestamps. In one or more embodiments of the present disclosure, the AI engine 112 can be configured to convert the audio file 110 to text and timestamp data. The time stamp data may associate each word in the text file with a timestamp from the audio file 110. The AI engine 112 may identify occurrences of words from the word bank 116 in the text. The AI engine 112 may be configured to transcribe audio input to text and correlate precise timestamp information from the audio input to each transcribed word. The AI engine 112 may correlate the text with timestamps of the audio file 110. The AI engine 112 can be further configured to identify timestamps 118, where the timestamps 118 can correspond to the occurrences of the words in the word bank 116 during the playback of the digital video 124 streamed by the digital video player 108. For example, the AI engine 112 can convert the temporary audio file 114 to text, and parse through the text to find specific times when a word from the word bank 116 is said during the playback of the digital video 124, these times becoming the timestamps 118.

In some embodiments, the censor system 122 can receive the timestamps 118 from the AI engine 112 corresponding to moments in the digital video 124 where the words in the word bank 116 are used. Furthermore, the censor system 122 can manipulate a mute function of the digital video player 108 by sending a mute function command 120 at specific times of the digital video 124 based on the timestamps 118 received from the AI engine 112. In some embodiments, the mute function can be manipulated by at least one of a browser extension or an external application. The censor system 122 may track a current playback time of the digital video 124 and send a first mute function command when the current playback time matches the timestamps 118 to mute the digital video player 108. After a preconfigured mute duration (e.g., buffer time) the censor system 122 may send a second mute function command to the digital video player 108 to cause the digital video 124 to be unmuted. The commands sent from the censor system 122 to the digital video player 108 may comprise an API command. In some embodiments, the censor system 122 may send mute and unmute commands the equipment (e.g., cellphone, tablet, computer) displaying the digital video player 108 to mute and unmute the volume at a system level instead of sending the mute function command 120 to the digital video player 108.

In at least one example, the mute function can be a function of the digital video player 108. In some embodiments, the censor system 122 may send commands to manipulate different features already established in the digital video player 108 such as skip features, volume features, pause features, etc. This can enable the censor system 122 to censor different words without changing and/or otherwise altering the audio file 110 or the digital video 124 streamed from the digital video player 108. Therefore, the mute function can be manipulated independent of the digital video 124. The mute function can be manipulated automatically as the digital video 124 is played.

The methods, systems, configurations, and advantages described in FIG. 1 can be included alone or in combination in any other device or system described herein with reference to other figures. Likewise, methods, systems, configurations, and advantages described in other devices or systems with reference to other figures can be included alone or in combination shown and described with reference to FIG. 1.

FIG. 2 shows a flowchart of a method 202 for censoring digital media, in accordance with one or more embodiments of the present disclosure. The method 202 can be performed in a number of ways. In at least one embodiment, a non-transitory computer-readable storage medium, the computer-readable storage medium including instructions that when executed by a computer, can cause the computer to execute the method 202. Similarly, a computer apparatus can include a processor and a memory for storing instructions, that, when executed by the processor, configure the apparatus to execute the method 202. The method 202 can further be executed by other processors and/or electronic devices.

In the illustrated embodiment, the method 202 includes obtaining 222 a user input via a user interface in regard to a digital video. The method 202 can further include obtaining 224 an audio file for the digital video. In some embodiments, the method 202 can include sending 226 the audio file and a word bank to an artificial intelligence (AI) engine. Additionally, the method 202 can include converting 228 the audio file to text and identifying occurrences of words from the word bank and timestamps corresponding to the occurrences via the AI engine. In some embodiments, the method 202 can include receiving 230 the timestamps from the AI engine corresponding to moments in the digital video where the words in the word bank are used. Furthermore, the method 202 can include manipulating 232 a mute function of a player of the digital video based at least in part on the timestamps received from the AI engine.

In some embodiments of the method 202, the audio file is obtained by identifying a Uniform Resource Locator (URL) that is in focus when the user input is received and storing the audio file associated with the digital video on the URL.

In one or more embodiments of the method 202, the user interface prompts a user to enter the user input, the user input comprising at least one of a buffer time or a word bank addition. Additionally, and according to the method 202, the user input via the user interface initiates at least one of a playback of the digital video or sending the audio file to the AI engine.

In some embodiments of the method 202, the user interface includes a mute icon, the mute icon configured to overlay a portion of the player during when the mute function of the digital player is activated.

In at least one embodiments of the method 202, the mute function is manipulated by at least one of a browser extension or an external application, the mute function being manipulated independent of the digital video.

In one or more embodiments of the method 202, manipulating the mute function comprises: monitoring a current time of the digital video during playback; sending the player a mute API command when the current time aligns with one of the timestamps; and sending an unmute API command after a buffer interval.

In some embodiments of the method 202, the digital video comprises a live feed; and wherein the method 202 further comprises: delaying the live feed; repeatedly buffering audio segments from the live feed to generate the audio file such that audio segments of the live feed are repeatedly sent to the AI engine during the live feed; and automatically beginning to play the live feed when a first set of timestamps associated with a first buffered audio segment is received.

The methods, systems, configurations, and advantages described in FIG. 2 can be included alone or in combination in any other device or system described herein with reference to other figures. Likewise, methods, systems, configurations, and advantages described in other devices or systems with reference to other figures can be included alone or in combination shown and described with reference to FIG. 2.

Figure 3:
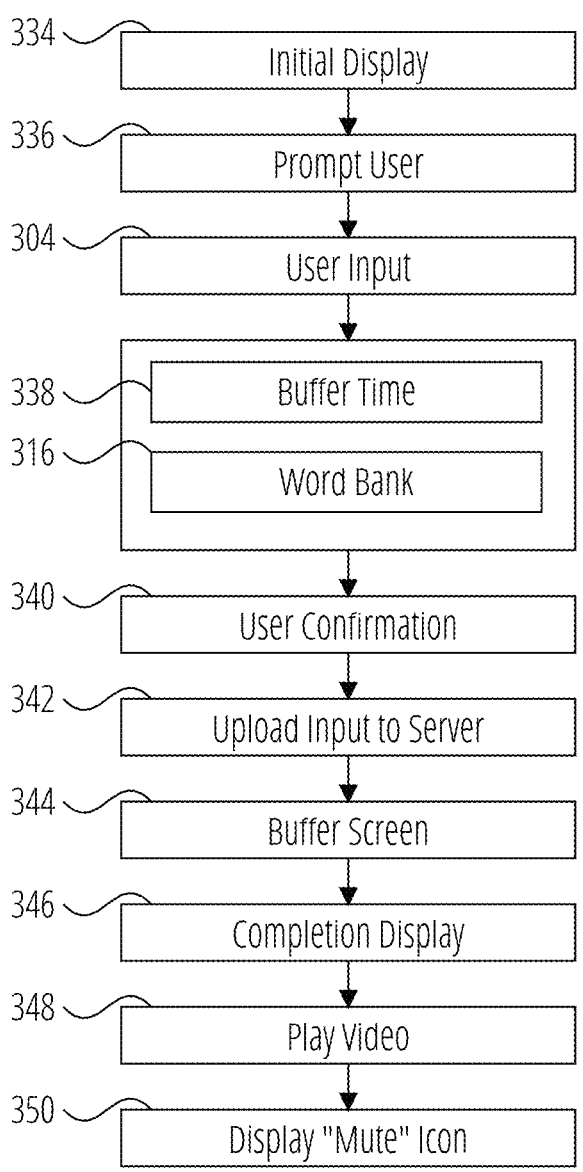
FIG. 3 illustrates a flowchart of the User Interface (UI) according to one or more embodiments of the present disclosure.

FIG. 3 illustrates a flowchart describing different example functions of the UI (e.g. UI 106 in FIG. 1), in accordance with one or more embodiments of the present disclosure. In some embodiments, the censor system (e.g. censor system 122 in FIG. 1) can be configured to guide the user through censoring a digital video via the UI. Additionally, the censor system can use the UI to display information about and censoring process. In at least one embodiment, a number of steps/tasks associated with the UI can be iterated through by the censor system for the censoring of various digital media.

In some embodiments, the censor system can perform an initial display step 334. This step can enable the UI to be displayed to the user. In some embodiments, the UI can be configured to display controls and and visual elements to the user via a display of an electronic device such as a phone, computer, tablet, or similar device. Additionally, the censor system can perform the initial display step 334 when the user accesses the censoring application described herein, or automatically when a URL with a compatible digital video player is navigated to by the user. This step can further include notifying the user that they are using the censoring application.

In some embodiments, the censor system can execute a prompt user step 336. In this step, the censor system can be configured to prompt the user to enter information relevant to the censoring of the digital video via the UI. This step can further include displaying input elements (e.g., text fields, radio buttons, buttons, checkboxes, dropdown menus, sliders, switches, etc.) to provide the user with places to fill out this information directly into the UI. This can increase the case by which the user can tailor the censoring done to the digital video.

In some embodiments, the censor system can be configured to receive the user input 304. In some embodiments, the user input 304 can include at least a buffer time 338 or a one or more words for a word bank 316. The censor system may include a default word bank 316 and add the one or more additional words from the user input to customize the word banks 316. In some embodiments, the buffer time 338 can be the time duration for which the digital video is muted after a word from the word bank 316 is detected. In at least this example, the buffer time 338 can be adjusted by the user when inputting the user input 304 via the UI. As described above the word bank 316 can include custom words input by the user to be censored in the digital video.

In at least one embodiment, after the user enters the user input 304 into the UI, the censor system can then proceed to a user confirmation step 340. In this step, the UI can prompt the user to verify the user input 304. In this step, the UI can be configured to display a confirmation to the user. In at least one embodiment, the censor system can further be configured to wait for the user to perform an action confirming the user input 304 and/or their intent to continue with the censoring of the digital video (e.g. digital video 124 in FIG. 1). In some embodiments, the censor system can wait for the user to press a physical or digital button displayed by the UI before moving on to additional steps. In some embodiments, the user input 304 via the UI can initiate the sending of the audio file (e.g. audio file 110 in FIG. 1) to the AI engine (e.g. AI engine 112 in FIG. 1) without further confirmation from the user with the user confirmation step 340.

In one or more embodiments, the censor system can execute an upload step 342. In this step, the user input 304 can be uploaded to a server. After uploading to the server, at least some of the user input 304 can then be shared with the AI engine. For example, the censor system can provide the AI engine with the word bank 316. Additionally, the censor system can provide the AI engine with an audio file of the digital video and a prompt to convert the audio to text, identify occurrences of words from the word bank 316 in the text file, and identify timestamps from the audio file that correspond to those words. As the AI engine parses through the user input 304 in preparation to provide timestamps (e.g. timestamps 118 in FIG. 1), the UI can move to a buffer screen step 344. In this step, the UI can be configured to display the progress of the AI engine to the user. A further example of the buffer screen step 344 is illustrated in FIG. 7 of the present disclosure.

In some embodiments, the censor system can move to a completion display step 346 after the AI engine has provided the timestamps related to the user input 304. In this step, the UI can be configured to show relevant data to the user pertaining to the timestamps or the digital video. For example, the UI can display the number of timestamps acquired by the AI engine. A further example of the completion display step 346 is illustrated in FIG. 8 of the present disclosure.

In at least one embodiment, the digital video can be started through a play video step 348. In this step, a playback of the digital video can be initiated. In some embodiments, the user input 304 via the UI can initiate at least one playback of the digital video. For example, after the user confirms the user input 304 or their intent to censor the digital video via the user confirmation step 340, a playback of the digital video can be initiated without further input from the user. In some embodiments, the playback can be initiated once the AI engine has identified the relevant timestamps for the digital video. In some embodiments, the playback can be initiated by a user by selecting a play button on a digital video player.

Figure 9:
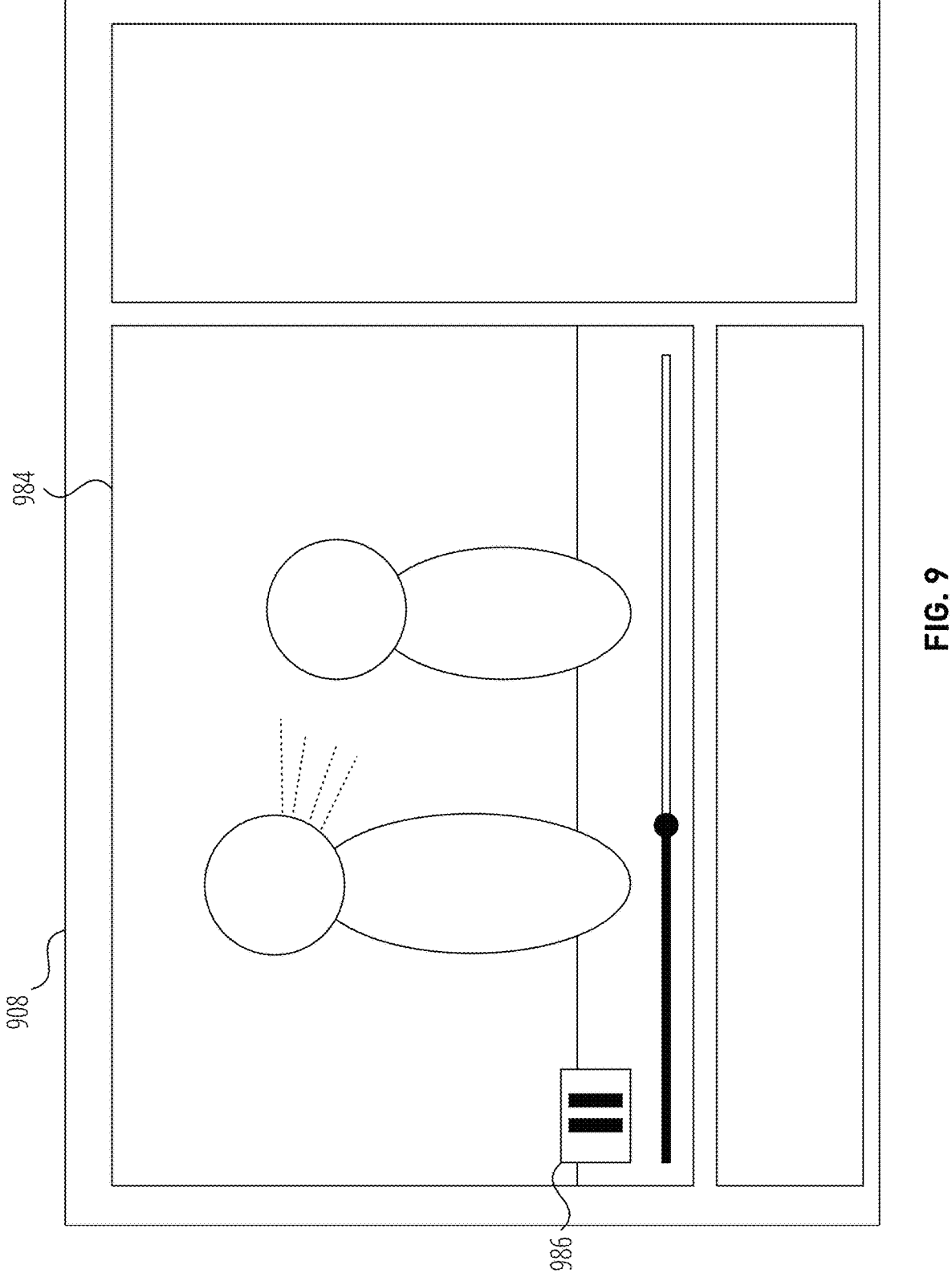
FIG. 9 illustrates an example of a mute icon being displayed during the playback of a digital video according to one or more embodiments of the present disclosure.

After initiating a playback of the digital video, the censor system can move to a display "mute" icon step 350. In this step, the UI can be configured to display a mute icon for the duration of the mute function. This can enable the user to identify when the mute function is occurring, therefore helping the user differentiate the mute function from other sounds, or lack thereof, during the playback of the digital video. In some embodiments, the mute icon can be configured to overlay a portion of the digital video during the manipulation of the mute function. An example of this is illustrated in FIG. 9 of the present disclosure.

The methods, systems, configurations, and advantages described in FIG. 3 can be included alone or in combination in any other device or system described herein with reference to other figures. Likewise, methods, systems, configurations, and advantages described in other devices or systems with reference to other figures can be included alone or in combination shown and described with reference to FIG. 3.

Figure 4:
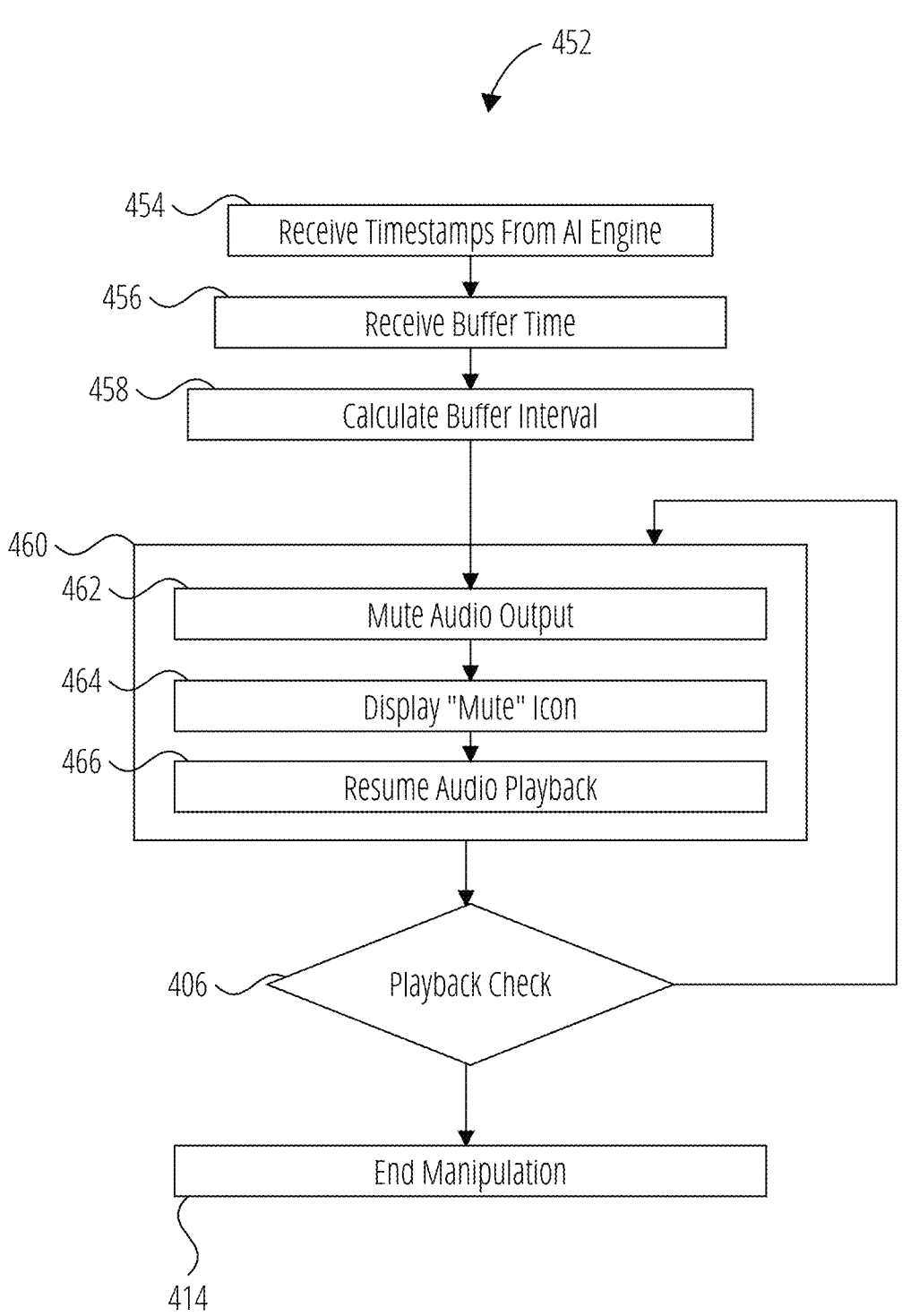
FIG. 4 illustrates a flowchart of a mute function according to one or more embodiments of the present disclosure.

FIG. 4 illustrates a flowchart of a censoring method 452, in accordance with one or more embodiments of the present disclosure. In some embodiments, the censor system (e.g. censor system 122 in FIG. 1) can censor digital media via the censoring method 452. In at least one embodiment, the censoring method 452 can include a number of steps pertaining to the censoring of the digital video, where censoring method 452 can censor different portions of the audio of digital video (e.g. digital video 124 in FIG. 1).

In some embodiments, the censoring method 452 can include a receive timestamps step 454. In at least one embodiment, this step can include receiving timestamps (e.g. timestamps 118 in FIG. 1) from the AI engine (e.g. AI engine 112 in FIG. 1). In some embodiments, multiple timestamps can be received from the AI engine, where each of the timestamps correspond to a position in the audio of the digital video (e.g. digital video 124 in FIG. 1) that matches the user input (e.g. user input 104 in FIG. 1).

In at least one embodiment, the censoring method 452 can further include a receive buffer time step 456. In this step, the buffer time (e.g. buffer time 338 in FIG. 3) can be received, where the buffer time can initially be input by the user via the UI (e.g. UI 106 in FIG. 1) or a default value. The buffer time may define a mute duration. The censoring method 452 can further include a calculate buffer interval step 458. In some embodiments, the calculate buffer interval step 458 can include determining when to censor the digital video based on the timestamps, and how long to censor the digital video based on the buffer time. For example, the timestamps can denote where the audio output containing a word matching a word from the word bank (e.g. word bank 116 in FIG. 1) begins. Starting from these timestamps, the audio output from the digital video can be censored for a duration corresponding to the buffer time. This can enable the user to choose how long to censor each instance of audio matching the user input. The censor system may mute the digital video at the timestamps for the buffer time.

The censoring method 452 can execute a censor loop 460. In some embodiments, the censoring loop 460 can be a recursive feature that can repeat until a certain condition is reached. In at least one embodiment, the censor loop 460 can repeat until the playback of the digital video completes. In some embodiments, the censor loop 460 can repeat until the playback of the digital video has moved passed all of the timestamps corresponding to occurrences of the words in the word bank in the digital video. In some embodiments, the censor loop 460 can repeat until there is no more censoring to be done during the playback of the digital video.

In some embodiments, the censor loop 460 can be configured to perform a number of steps in order to censor the words in the word bank. In at least one embodiment, the censor loop 460 can include a mute audio output step 462. In this step, the censor loop 460 can be configured to mute the audio output of the digital video for the duration of the buffer time. In some embodiments, the censor system can perform this step by sending a mute API command to the digital video player when a timestamp is reached, and sending an unmute API command to the digital video player when the buffer time after the timestamp has occurred.

In one or more embodiments of the present disclosure, the mute audio output step 462 can be configured to mute the audio output of the digital video via manipulation of the mute function (e.g. mute function command 120 in FIG. 1) of the digital video player (e.g. digital video player 108 in FIG. 1). In this step, the censor system can monitor a current time of the digital video during playback. For example, the digital video player may send the current time of the digital video to the censor system, and the censor system may compare the current time to the timestamps. With the current time, the censor system can send the digital video player a mute API command when the current time aligns with one of the timestamps.

After muting the audio output via manipulation of the mute function, the censor loop 460 can then cause the censor system to perform a display a mute icon step 464. In this step, the censor system can be configured to display the mute icon via the UI overlaid onto the digital video for the duration of the buffer time. As described previously, this can further enable the user to determine when the mute function manipulates the digital video player digital video player.

In at least one embodiment, the censor loop 460 can include a resume audio playback step 466. In this step, the censor system can unmute the audio playback of the digital video. In some embodiments, the censor system can be configured to unmute the audio playback after a duration of time (e.g., buffer time) has passed since muting the audio playback in correspondence with the timestamps. In other words, when the duration of the buffer time has occurred after reaching a timestamp, normal audio may resume in accordance with the playback of the digital video.

In some embodiments, when the resume audio playback step 466 is reached, the censor system can send an unmute command. In some embodiments, the censor system can send an unmute API command after the amount of time calculated from the calculate buffer interval step 458. The use of API commands can enable the mute function to mute the audio of the digital video directly through manipulation of the digital video player digital video player and not the digital video itself.

In one or more embodiments, the censor loop 460 can repeat until the playback of the digital video completes or the current time of the playback of the digital video exceeds all of the timestamps received from the AI engine. In some embodiments, after the steps in the censor loop 460 are iterated through, the censor method 452 can move to a playback check step 406. During the playback check step 406, the censor system can check to see if there are any timestamps remaining that have not yet occurred during the current playback of the digital video. If there are timestamps remaining that have not yet occurred, the playback check step 406 can direct the censor system to move to the beginning of the censor loop 460. This can enable the censor system to continuously manipulate the mute function for all timestamps occurring during the playback of the digital video.

In at least one embodiment, if there are no timestamps that have not yet occurred when the censoring method 452 reaches the playback check step 406, the censor method can then move to an end manipulation step 414. In this step, the censor system can cease to manipulate the mute function and exit the censoring method 452.

The methods, systems, configurations, and advantages described in FIG. 4 can be included alone or in combination in any other device or system described herein with reference to other figures. Likewise, methods, systems, configurations, and advantages described in other devices or systems with reference to other figures can be included alone or in combination shown and described with reference to FIG. 4.

Figure 5:
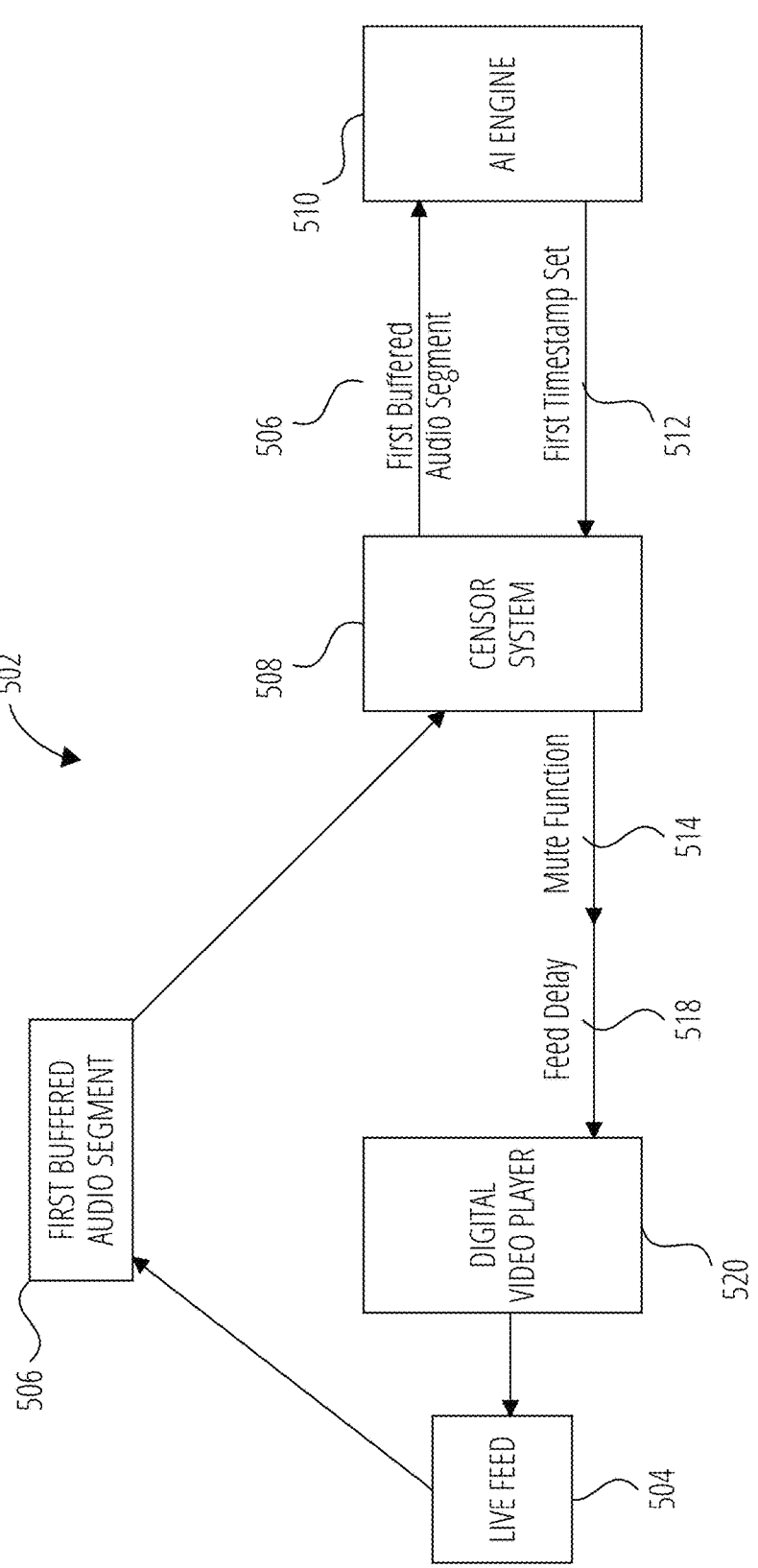
FIG. 5 illustrates an aspect of the subject matter in accordance with one embodiment.

FIG. 5 is an illustration of a block diagram 502 for censoring a live feed, in accordance with one or more embodiments of the present disclosure. In some embodiments, the censor system 508 can be configured to censor live videos. In one or more embodiments, the digital video (e.g. digital video 124 of FIG. 1) can include a live feed 504. In this embodiment, the live feed 504 can be censored before being shown to the user. In some embodiments, the censoring of the live feed 504 can be accomplished by repeatedly buffering audio segments from the live feed 504. The censor system 508 can repeatedly send incremental segments of the audio file of the live feed 504 to the AI engine 510 during the duration of the live feed 504.

Additionally, and in some embodiments, the censor system 508 can automatically play the live feed 504 after the first buffered audio segment 506 is processed by the AI engine 510 which may result in a first timestamp set 512 associated with a first buffered audio segment 506. This can enable the censor system 508 to censor live videos during a delay between the live feed and what is portrayed to the user. Furthermore, the mute function 514 can include mute commands for a feed delay 518. The mute commands may indicate when to mute and unmute the live video based on the feed delay 518. In some embodiments, the feed delay 518 can be one or more API commands (e.g., pause and unpause after a delay buffer) that can cause the digital video player 520 to delay the playback of the live feed 504. This can add to the delay, thus giving the censor system 122 time to censor the live feed 504 based on the first buffered audio segment 506. In at least one embodiment, the delay before the user views the live feed 504 can include the time taken for the censor system 508 to receive the first buffered audio segment 506, receive the first timestamp set 512, and send the mute function command 120 with the feed delay 518.

After this delay, the live feed 504 can resume a normal playback without further delays until completion.

The methods, systems, configurations, and advantages described in FIG. 5 can be included alone or in combination in any other device or system described herein with reference to other figures. Likewise, methods, systems, configurations, and advantages described in other devices or systems with reference to other figures can be included alone or in combination shown and described with reference to FIG. 5.

Figure 6:
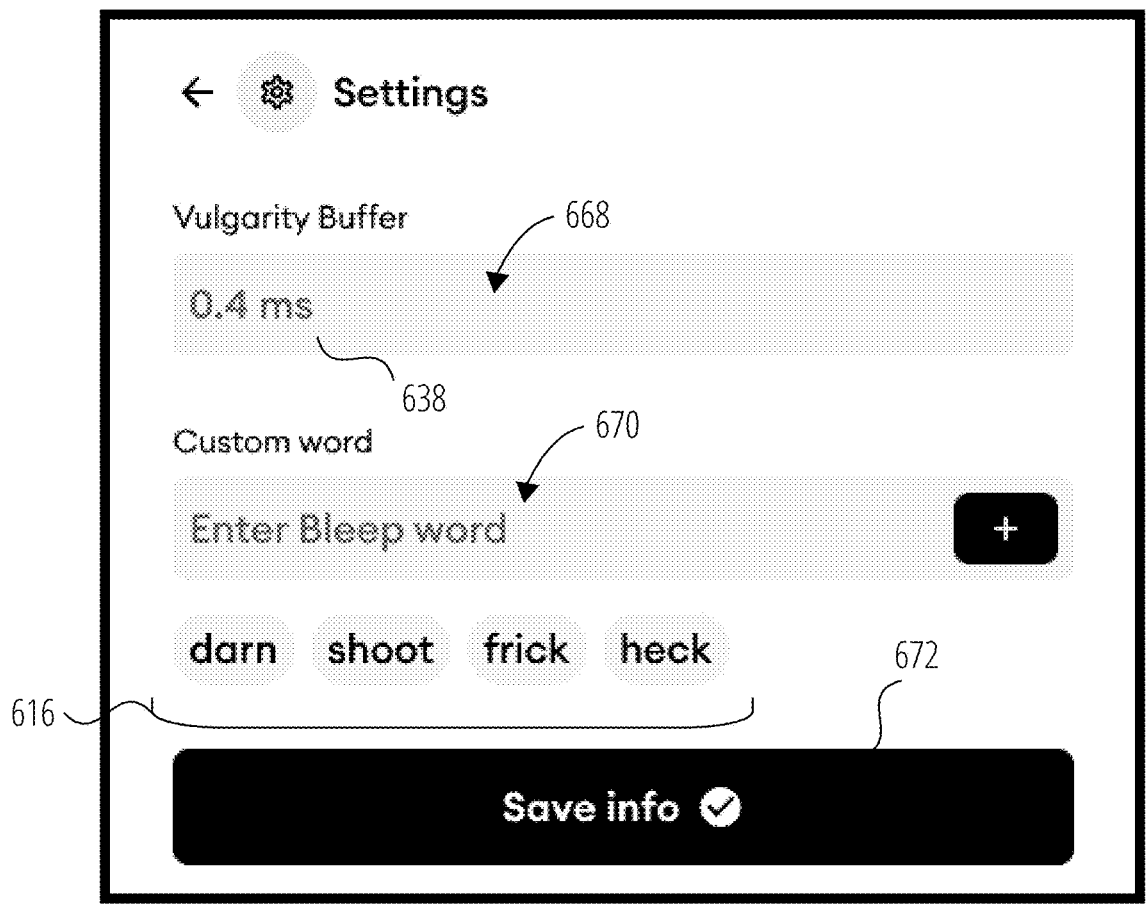
FIG. 6 illustrates an example of the UI prompting user input according to one or more embodiments of the present disclosure.

FIG. 6 shows an example of a user prompt window 674 of the UI (e.g. UI 106 in FIG. 1), in accordance with one or more embodiments of the present disclosure. In some embodiments, the user prompt window 674 can be a window displayed via the UI. In at least one embodiment, the user prompt window 674 can prompt the user to enter the user input (e.g. user input 104 in FIG. 1). In at least one embodiment, the user input can include at least one of the buffer time 638 or an addition to the word bank 616.

In some embodiments, the user can enter the user input directly into the UI, as shown by the user prompt window 674 illustrated in FIG. 6. In at least one embodiment, the buffer time 638 can be input by the user into a buffer field 668. In one or more embodiments, the buffer field 668 can be a text field displayed by the user prompt window 674. Additionally, the buffer field 668 can be configured to receive numbers, where the numbers denote a time-delay that can be used to calculate how long to censor the audio output (e.g., mute the audio using API commands to control the mute function of the digital video player 108) of the digital video (e.g. digital video 124 in FIG. 1) for each of the timestamps (e.g. timestamps 118 in FIG. 1). In some embodiments, the buffer field 668 can be configured to receive a time in milliseconds.

As seen in FIG. 6, words from the word bank 616 can be displayed by the user prompt window 674 adjacent to a custom word field 670. Similar to the buffer field 668, the custom word field 670 can be a text field displayed by the UI via the user prompt window 674. In some embodiments, the custom word field 670 can be configured to receive words and add them to the word bank 616. In some embodiments, the words added by the user via the custom word field 670 can be displayed in the word bank 616 by the user prompt window 674.

Additionally, the user prompt window 674 can include a confirmation button 672. In some examples, the confirmation button 672 can be a digital button, that, when pressed by the user, can store the buffer time 638 and word bank 616 entered by the user as the user input 604. Furthermore, the user input 604 can then be sent to the AI engine (e.g. AI engine 112 in FIG. 1) for calculating the timestamps.

The methods, systems, configurations, and advantages described in FIG. 6 can be included alone or in combination in any other device or system described herein with reference to other figures. Likewise, methods, systems, configurations, and advantages described in other devices or systems with reference to other figures can be included alone or in combination shown and described with reference to FIG. 6.

FIG. 7 shows an example of a progression window 776 of the UI (e.g. UI 106 in FIG. 1), in accordance with one or more examples of the present disclosure. In some embodiments, the progression window 776 can be displayed to the user after the user input (e.g. user input 104 in FIG. 1) is sent to the AI engine (e.g. AI engine 112 in FIG. 1) and while the AI engine is generating timestamps (e.g. timestamps 118 in FIG. 1).

In some embodiments, the progression window 776 can be configured to show the progress of the AI engine generating the timestamps. In at least one embodiment, the progression window 776 can include a progression icon 778. In some embodiments, the progression icon 778 can be configured to show the progress of the AI engine generating the timestamps. In some embodiments, the progression icon 778 can show a progress bar, progress ring, percentage, or other indicator of progression related to the AI engine. In some examples, the progression window 776 can be configured to display text in addition to the progression icon 778. In one or more embodiments, the text displayed by the progression window 776 of the UI can be configured to further inform the user of the progress of the AI engine in performing one or more tasks associated with censoring various digital media.

The methods, systems, configurations, and advantages described in FIG. 7 can be included alone or in combination in any other device or system described herein with reference to other figures. Likewise, methods, systems, configurations, and advantages described in other devices or systems with reference to other figures can be included alone or in combination shown and described with reference to FIG. 7.

FIG. 8 shows an example of a completion window 880 of the UI (e.g. UI 106 in FIG. 1), in accordance with one or more examples of the present disclosure. In some embodiments, the completion window 880 can be displayed to the after the AI engine (e.g. AI engine 112 in FIG. 1) has completed generating timestamps (e.g. timestamps 118 in FIG. 1) and the digital video is ready for playback with appropriate censors.

In some embodiments, the completion window 880 can be configured to show the completion of the AI engine in generating the timestamps. In at least one embodiment, the completion window 880 can include a completion icon 882. In some embodiments, the completion icon 882 can be configured to show the completion of the AI engine in generating the timestamps. In some embodiments, the completion icon 882 can show a checkmark, percentage, or other indicator of completion related to the AI engine. In some examples, the completion window 880 can be configured to display text in addition to the completion icon 882. In one or more embodiments, the text displayed by the completion window 880 of the UI can be configured to further inform the user that the AI engine has completed one or more tasks. For example, the text displayed by the completion window 880 can include a number of words that have been successfully censored from the digital video.

The methods, systems, configurations, and advantages described in FIG. 8 can be included alone or in combination in any other device or system described herein with reference to other figures. Likewise, methods, systems, configurations, and advantages described in other devices or systems with reference to other figures can be included alone or in combination shown and described with reference to FIG. 8.

FIG. 9 shows an example of the digital video player 908 playing a digital video 984, in accordance with one or more examples of the present disclosure. In some embodiments, the digital video player 908 can be a streaming service, mobile application, in-browser window, or other software capable of streaming digital videos. For example, the digital video player 908 can be a YouTube window, where YouTube can be configured to stream a number of digital videos to the user. In some embodiments of the present disclosure, the user interface (e.g. UI 106 in FIG. 1) can be an application separate from the digital video player 908. In one or more examples, the digital video player 908 can play the digital video 984 for the user.

In some embodiments, the user interface can include a mute icon 986. In at least one embodiment, the mute icon 986 can be a pop-up window/graphic. For example, the mute icon 986 can display a logo or other image that the user can associate with the mute function (e.g. mute function command 120 in FIG. 1). In some embodiments, the mute icon 986 can be configured to overlay a portion of the digital video player 908 during the manipulation of the mute function. This can enable the user to attribute a loss in audio to the mute function during the playback of the digital video 984.

The methods, systems, configurations, and advantages described in FIG. 9 can be included alone or in combination in any other device or system described herein with reference to other figures. Likewise, methods, systems, configurations, and advantages described in other devices or systems with reference to other figures can be included alone or in combination shown and described with reference to FIG. 9.

Figure 10:
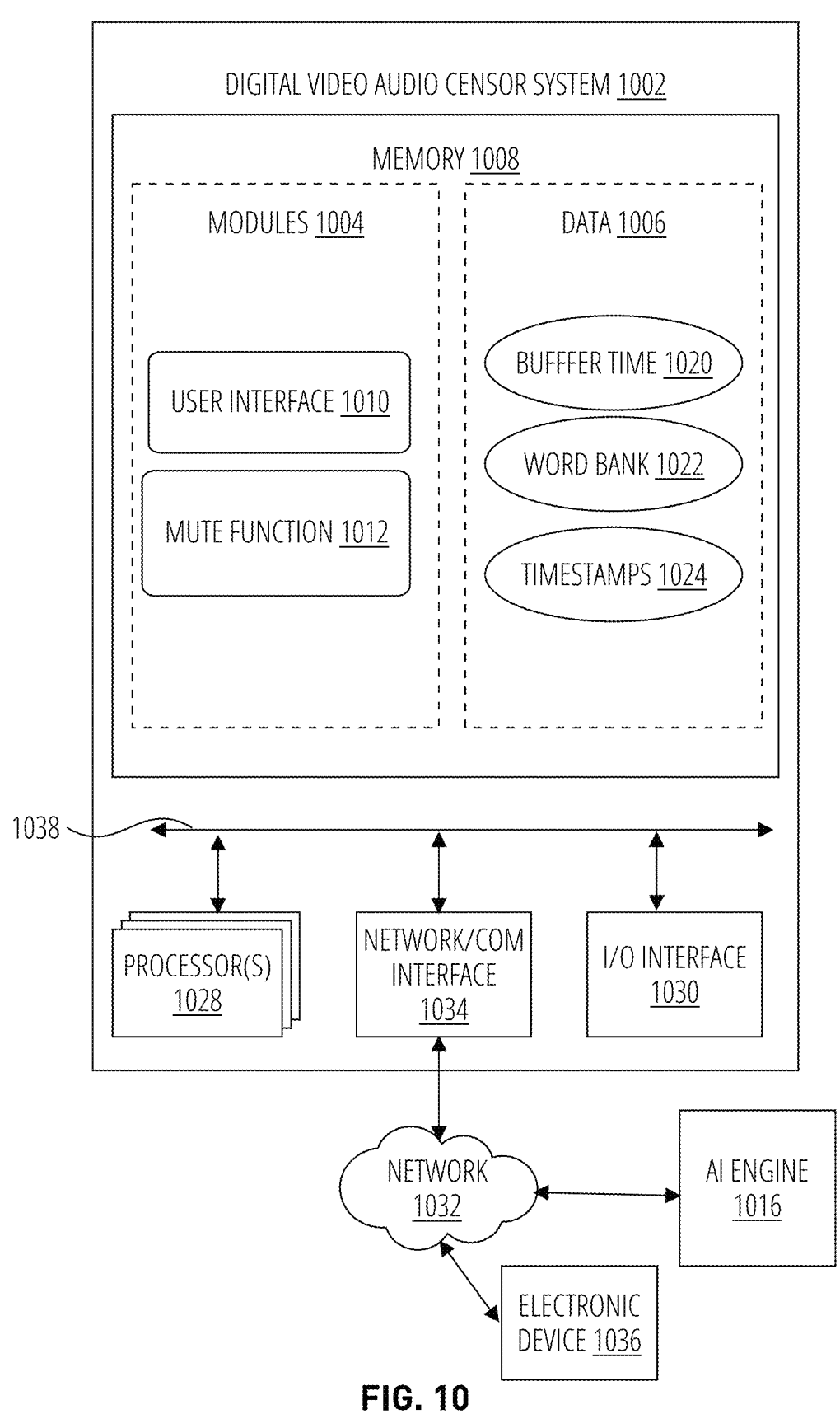
FIG. 10 illustrates a block diagram of a digital video audio censor system according to one or more embodiments of the present disclosure.

FIG. 10 is a block diagram of a digital video audio censor system 902 in accordance with one or more embodiments of the present disclosure. The digital video audio censor system 902 may perform the method of the signal flow block diagram in FIG. 1. The digital video audio censor system 1002 can include a memory 1008, one or more processors 1028, a network interface 1034, an input/output (I/O) interface 1030, and a system bus 1038.

The processor(s) 1028 may include one or more general purpose devices, such as an Intel®, AMD®, or other standard microprocessor. The one or more processors 804 may include a special purpose processing device, such as ASIC, SoC, SiP, FPGA, PAL, PLA, FPLA, PLD, or other customized or programmable device. The one or more processors 804 can perform distributed (e.g., parallel) processing to execute or otherwise implement functionalities of the presently disclosed embodiments. The processor(s) 1028 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1008 may include static RAM, dynamic RAM, flash memory, one or more flip-flops, ROM, CD-ROM, DVD, disk, tape, or magnetic, optical, or other computer storage medium. The memory 1008 may include a plurality of program modules 1004 and program data 1006. The memory 1008 may be local to the digital video audio censor system 1002, as shown, or may be distributed and/or remote relative to the digital video audio censor system 1002.

The program modules 1004 may include all or portions of other elements of the digital video audio censor system 1002. The program modules 1004 may run multiple operations concurrently or in parallel by or on the processor(s) 1028. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like. The modules 1004 may comprise a user interface 1010, and a mute function 1012.

The memory 1008 may also include the data 1006. Data generated by the digital video audio censor system 1002 may be stored on the memory 1008. The data 1006 may include a buffer time 1020, a word bank 1022, and time-stamps 1024.

The I/O interface 1030 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 1034 may facilitate communication with other computing devices and/or networks and/or other computing and/or communications networks. For example, the network interface 1034 may communicate with an AI engine 1016 and an electronic device 1036. The digital video audio censor system 1002 may provide the electronic device 1036 with a graphical user interface to receive inputs and display outputs.

The network interface 1034 may be equipped with conventional network connectivity, such as, for example, Ethernet (IEEE 1102.3), Token Ring (IEEE 1102.5), Fiber Distributed Datalink Interface (FDDI), or Asynchronous Transfer Mode (ATM). Further, the network interface 1034 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 1038 may facilitate communication and/or interaction between the other components of the digital video audio censor system 1002, including the processor(s) 1028, the memory 1008, the I/O interface 1030, and the network interface 1034.

The methods, systems, configurations, and advantages described in FIG. 10 can be included alone or in combination in any other device or system described herein with reference to other figures. Likewise, methods, systems, configurations, and advantages described in other devices or systems with reference to other figures can be included alone or in combination shown and described with reference to FIG. 10.

For one or more embodiments, at least one of the components set forth in one or more of the preceding figures may be configured to perform one or more operations, techniques, processes, and/or methods as set forth herein. For example, a processor as described herein in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended Claims.

What is claimed is:

1. A method for censoring digital media, the method comprising:
   obtaining a user input via a user interface in regard to digital media of a digital media source;
   obtaining an audio file for the digital media;
   sending the audio file and a word bank to an artificial intelligence (AI) engine;
   converting, via the AI engine, the audio file to text and corresponding timestamp data;
   identifying, via the AI engine, occurrences of words from the word bank in the text and timestamps corresponding to the occurrences, wherein the timestamps correspond to moments in the digital media where the words in the word bank are used; and
   manipulating a mute function of a digital media player that is presenting the digital media based on the timestamps received from the AI engine, wherein manipulating the mute function changes a local mute and unmute setting at a device running the digital media player and presenting the digital media.

2. The method of claim 1, wherein the audio file is obtained by identifying a Uniform Resource Locator (URL) that is in focus when the user input is received and storing the audio file associated with the digital media on the URL.

3. The method of claim 1, wherein the user interface prompts a user to enter the user input, the user input comprising at least one of a buffer time or a word bank addition, wherein the buffer time indicates an amount of time the digital media player is muted for after a timestamp corresponding to a censored word is reached.

4. The method of claim 1, wherein the user input via the user interface initiates at least one of a playback of the digital media or sending the audio file to the AI engine.

5. The method of claim 1, wherein the user interface includes a mute icon, the mute icon configured to overlay a portion of the player during when the mute function of the digital player is activated.

6. The method of claim 1, wherein the mute function is manipulated by at least one of a browser extension or an external application, wherein the mute function is manipulated automatically as the digital media is played.

7. The method of claim 1, wherein manipulating the mute function comprises:
   monitoring a current time of the digital media during playback;
   sending the player a mute Application Programming Interface (API) command when the current time aligns with one of the timestamps; and
   sending an unmute API command after a buffer interval.

8. The method of claim 1, wherein the digital media comprises a live feed; and
   wherein the method further comprises:
      delaying the live feed;
      repeatedly buffering audio segments from the live feed to generate the audio file such that audio segments of the live feed are repeatedly sent to the AI engine during the live feed; and
      automatically beginning to play the live feed when a first a first buffered audio segment is processed by the AI engine.

9. A non-transitory computer-readable storage medium, the computer-readable storage medium including instructions that when executed by a computer, cause the computer to:
   obtain a user input via a user interface in regard to digital media of a digital media source;
   obtain an audio file for the digital media;
   send the audio file, a word bank, and a prompt to an artificial intelligence (AI) engine, wherein the prompt instructs the AI engine to convert the audio file to text and identify occurrences of words from the word bank in the text and timestamps corresponding to the occurrences, wherein the timestamps correspond to moments in the digital media where the words in the word bank are used;
   receive the timestamps from the AI engine; and
   manipulate a mute function of a digital media player that is presenting the digital media based at least in part on the timestamps received from the AI engine, wherein manipulating the mute function changes a local mute and unmute setting at a device running the digital media player and presenting the digital media.

10. The computer-readable storage medium of claim 9, wherein the audio file is obtained via a URL of the digital media.

11. The computer-readable storage medium of claim 9, wherein the user interface prompts a user to enter the user input, the user input comprising at least one of a buffer time or a word bank addition.

12. The computer-readable storage medium of claim 9, wherein the user interface includes a mute icon that is displayed during the manipulation of the mute function of the digital media.

13. The computer-readable storage medium of claim 9, wherein the mute function is manipulated by at least one of a browser extension or an external application, wherein the mute function is manipulated automatically as the digital media is played.

14. The computer-readable storage medium of claim 9, wherein manipulating the mute function comprises:

monitoring a current time of the digital media during playback;

sending the player a mute Application Programming Interface (API) command when the current time aligns with one of the timestamps; and sending an unmute API command after a buffer interval.

15. The computer-readable storage medium of claim 9, wherein the digital media comprises a live feed; and wherein the instructions further cause the computer to introduce a feed delay by pausing the digital media for a period of time, and wherein the mute function of the digital player is activated when the timestamps are reached based on the feed delay.

16. A computing apparatus comprising:

a processor; and a memory storing instructions that, when executed by the processor, configure the apparatus to:

obtain a user input via a user interface in regard to digital media of a digital media source;

obtain an audio file for the digital media;

send the audio file, a word bank, and a prompt to an artificial intelligence (AI) engine, wherein the prompt instructs the AI engine to convert the audio file to text and identify occurrences of words from the word bank in the text and timestamps corresponding to the occurrences, wherein the timestamps correspond to moments in the digital media where the words in the word bank are used;

receive the timestamps from the AI engine; and manipulate a mute function of a digital media player that is presenting the digital media based at least in part on the timestamps received from the AI engine, wherein manipulating the mute function changes a local mute and unmute setting at a device running the digital media player and presenting the digital media.

17. The computing apparatus of claim 16, wherein the user interface prompts a user to enter the user input, the user input comprising at least one of a buffer time or a word bank addition.

18. The computing apparatus of claim 16, wherein the user interface includes a mute icon displayed during the manipulation of the mute function over the digital media.

19. The computing apparatus of claim 16, wherein manipulating the mute function comprises:

monitoring a current time of the digital media during playback;

sending the player a mute Application Programming Interface (API) command when the current time aligns with one of the timestamps; and sending an unmute API command after a buffer interval.

20. The computing apparatus of claim 16, wherein the digital media comprises a live feed; and wherein the instructions further configure the apparatus to introduce a feed delay by pausing the digital media for a period of time, and wherein the mute function of the digital player is activated when the timestamps are reached based on the feed delay.

\* \* \* \* \*